(12) United States Patent
Hirata et al.

(10) Patent No.: US 12,227,091 B2
(45) Date of Patent: Feb. 18, 2025

(54) RELAY DEVICE AND POWER SUPPLY DEVICE FOR VEHICLE

(71) Applicant: SUBARU CORPORATION, Tokyo (JP)

(72) Inventors: Shogo Hirata, Tokyo (JP); Tomoya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/239,510

(22) Filed: Aug. 29, 2023

(65) Prior Publication Data

US 2024/0100965 A1   Mar. 28, 2024

(30) Foreign Application Priority Data

Sep. 22, 2022   (JP) ................. 2022-151225

(51) Int. Cl.
| | |
|---|---|
| *B60L 50/60* | (2019.01) |
| *H01H 45/12* | (2006.01) |
| *H01H 45/14* | (2006.01) |

(52) U.S. Cl.
CPC ............ *B60L 50/60* (2019.02); *H01H 45/12* (2013.01); *H01H 45/14* (2013.01); *B60L 2210/10* (2013.01)

(58) Field of Classification Search
CPC ..... B60L 50/60; B60L 2210/10; H01H 45/12; H01H 45/14
See application file for complete search history.

(56) References Cited

U.S. PATENT DOCUMENTS

2008/0116851 A1 *  5/2008  Mori ................... H02J 7/00302
                                                          320/136
2021/0116132 A1 *  4/2021  Abendschoen ......... F24C 7/088

FOREIGN PATENT DOCUMENTS

JP         2021-026898 A       2/2021

* cited by examiner

*Primary Examiner* — Jared Fureman
*Assistant Examiner* — Duc M Pham
(74) *Attorney, Agent, or Firm* — MCGINN I.P. LAW GROUP, PLLC

(57) ABSTRACT

A relay device includes: a first contact and a second contact; a driving mechanism; a first conductor; a second conductor; and a static relay and an electric heating element. The driving mechanism is configured to cause the first contact and the second contact to be close to each other or separated from each other. The first conductor is electrically coupled to the first contact. The second conductor is electrically coupled to the second contact. The static relay and an electric heating element are coupled between the first conductor and the second conductor. The electric heating element is disposed to allow heating of one or both of the first contact and the second contact.

8 Claims, 4 Drawing Sheets

RELAY DEVICE AND POWER SUPPLY DEVICE FOR VEHICLE

CROSS-REFERENCE TO RELATED APPLICATIONS

The present application claims priority from Japanese Patent Application No. 2022-151225 filed on Sep. 22, 2022, the entire contents of which are hereby incorporated by reference.

BACKGROUND

The disclosure relates to a relay device and a power supply device of a vehicle.

Japanese Unexamined Patent Application Publication No. 2021-026898 discloses a technique in which, in order to suppress freezing of a relay contact, relative humidity in a relay case is reduced by heating air around a through hole of the relay case.

SUMMARY

An aspect of the disclosure provides a relay device. The relay device includes a first contact, a second contact, a driving mechanism, a first conductor, a second conductor, a static relay, and an electric heating element. The driving mechanism is configured to cause the first contact and the second contact to be close to each other or separated from each other. The first conductor is electrically coupled to the first contact. The second conductor is electrically coupled to the second contact. The static relay and an electric heating element are coupled between the first conductor and the second conductor. The electric heating element is disposed to allow heating of one or both of the first contact and the second contact.

An aspect of the disclosure provides a power supply device for a vehicle. The vehicle includes an engine that is an internal combustion engine, a first battery that supplies electric power to an auxiliary machine of the engine, and a second battery that supplies electric power to a restart motor of the engine. The power supply device includes an electric power line that can transmit electric power between the first battery and the second battery, and the above-described relay device. The relay device is configured to open and close an electric path of the electric power line.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In an environment where a temperature rapidly changes from high to low, dew condensation and freezing may occur on a contact of a relay device.

It is desirable to provide a relay device that can operate even when freezing occurs on a contact and a power supply device of a vehicle that can reduce a malfunction in a cold season.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
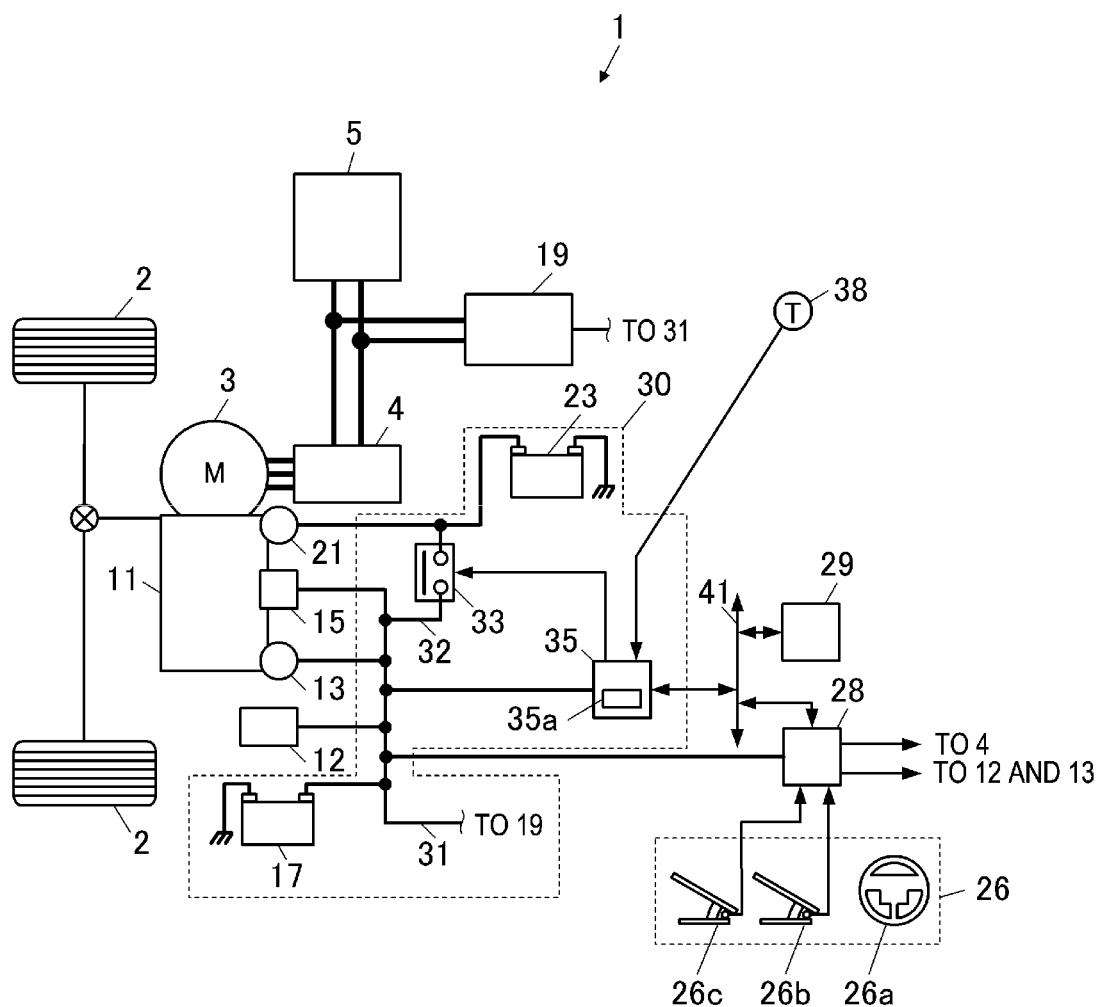
FIG. 1 is a block diagram illustrating a vehicle and a power supply device according to an embodiment of the disclosure.

FIG. 1 is a block diagram illustrating a vehicle and a power supply device according to the embodiment of the disclosure.

As illustrated in FIG. 1, a vehicle 1 according to the embodiment of the disclosure includes drive wheels 2, a traction motor 3 that sends power to the drive wheels 2, an inverter 4 that drives the traction motor 3, a traction battery 5 that stores electric power to drive the vehicle 1, an engine 11 that is an internal combustion engine, an auxiliary machine 12 for driving the engine 11, a starter motor 13 that starts the engine 11, an auxiliary battery 17 that stores electric power for driving the auxiliary machine 12, a generator 15 that generates electric power for driving the auxiliary machine 12 by power of the engine 11, a generator with motor function (for example, corresponding to an integrated starter generator (ISG)) 21 that generates electric power and outputs power for restarting the engine 11 after idling stop, and a restart battery 23 that stores electric power of the generator with motor function 21. In one embodiment, the traction battery 5 may serve as a "third battery", the auxiliary battery 17 may serve as a "first battery", the generator with motor function 21 may serve as a "restart motor", and the restart battery 23 may serve as a "second battery".

The auxiliary battery 17 and the restart battery 23 store and supply electric power at a voltage of a first voltage system (for example, a 12 V system). The traction battery 5 stores and supplies electric power at a voltage of a second voltage system (for example, a 100 V system or a 200 V system) higher than the first voltage system.

The vehicle 1 further includes a DC/DC converter 19 that can convert the voltage of the traction battery 5 into the voltage of the first voltage system and supply electric power to an electric power line 31 of the auxiliary machine 12.

The vehicle 1 further includes a driving operator 26 operated by a driver who drives the vehicle 1, and a vehicle controller 28 that performs control for driving of the vehicle 1.

The driving operator 26 includes a steering 26a, an accelerator operator 26b, and a brake operator 26c. Operation signals of the accelerator operator 26b and the brake operator 26c are sent to the vehicle controller 28. A configuration operated by an automatic driving system may be applied to the driving operator 26.

The vehicle controller 28 is one electronic control unit (ECU) or ECUs that communicate and cooperate with each other. The vehicle controller 28 performs driving control of the vehicle 1 based on an operation signal from the driving operator 26, communication information sent from another ECU, and various information such as a vehicle state detected by a sensor (not illustrated). For example, the vehicle controller 28 controls the auxiliary machine 12, the starter motor 13, the inverter 4, the DC/DC converter 19, and the generator with motor function 21.

Power Supply Device of Vehicle

The power supply device 30 according to the embodiment of the disclosure includes the electric power line 31 that transmits electric power from the auxiliary battery 17 and the DC/DC converter 19 to the auxiliary machine 12, the starter motor 13, the generator with motor function 21, and the vehicle controller 28, an electric power line 32 that couples the auxiliary battery 17 and the DC/DC converter 19 to the restart battery 23, a relay device 33 that opens and closes an electric path of the electric power line 32, a controller 35 that controls the relay device 33, and a temperature sensor 38 that measures a temperature of the engine room or the outside temperature. The generator with motor function 21 may be coupled to the restart battery 23. The temperature sensor 38 sends a detection signal representing a temperature to the controller 35.

Figure 2:
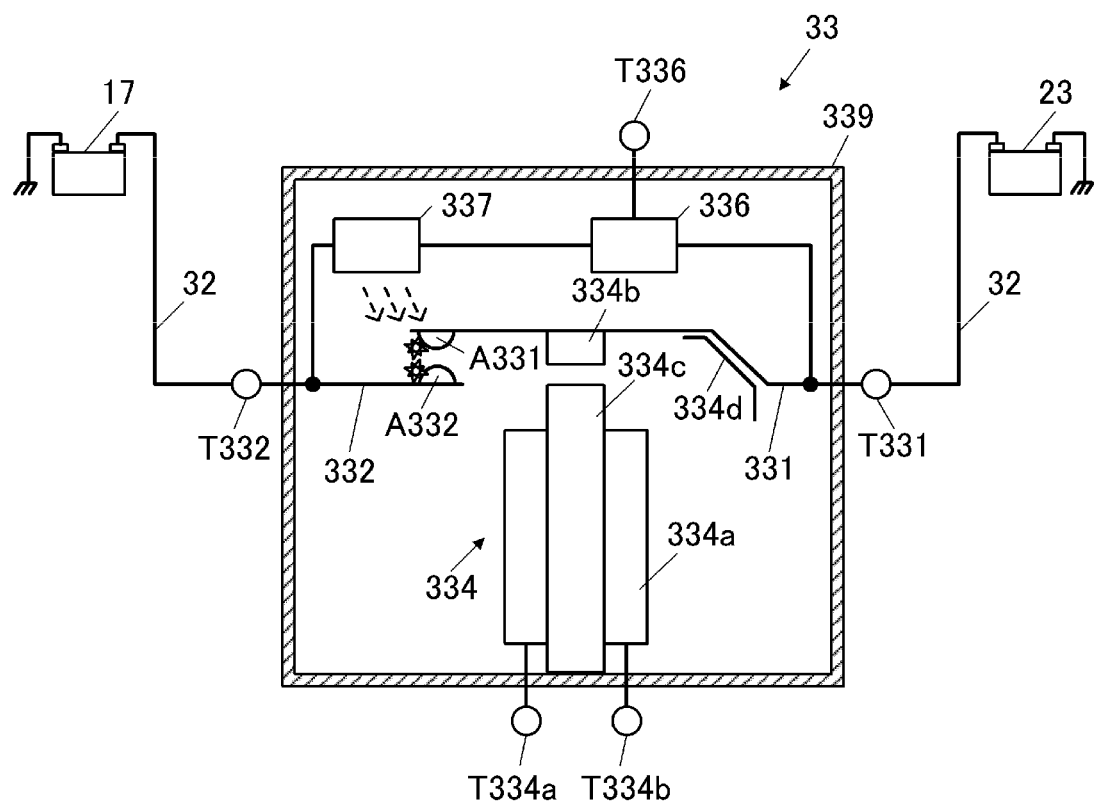
FIG. 2 is a configuration diagram illustrating a relay device in FIG. 1.

FIG. 2 is a configuration diagram illustrating a relay device. The relay device 33 includes a first contact A331 and a second contact A332 that are switchable between a state of being separated from each other and a state of being in contact with each other, a first terminal T331 to which one of the electric paths to be opened and closed is coupled and a second terminal T332 to which the other of the electric paths to be opened and closed is coupled, a first conductor 331 that electrically couples the first contact A331 with the first terminal T331, and a second conductor 332 that electrically couples the second contact A332 with the second terminal T332. A part of the first conductor 331 supports the first contact A331, and a part of the second conductor 332 supports the second contact A332. A part of the second conductor 332 has a structure that can be repositioned, and with the reposition, the first contact A331 and the second contact A332 is switched between a state of being separated from each other and a state of being in contact with each other.

The relay device 33 further includes a driving mechanism 334 that brings the first contact A331 and the second contact A332 to be close to or separated from each other, a static relay 336 and an electric heating element 337 coupled between the first conductor 331 and the second conductor 332, and a housing 339.

The housing 339 accommodates, inside the housing 339, the first contact A331, the second contact A332, the first conductor 331, the second conductor 332, the static relay 336, and the electric heating element 337. The housing 339 may be made of resin and may have a structure for sealing the inside. In addition to the first terminal T331 and the second terminal T332, a third terminal T334a and a fourth terminal T334b for flowing current to the driving mechanism 334 and a fifth terminal T336 for transmitting a control voltage to the static relay 336 are exposed outside the housing 339.

A configuration including a coil 334a, a movable iron core 334b, a fixed iron core 334c, and a spring 334d may be applied to the driving mechanism 334. In the case of this configuration, by energizing the coil 334a, a magnetic force is generated between the fixed iron core 334c and the movable iron core 334b to reposition the movable iron core 334b. Due to the reposition of the movable iron core 334b, the first contact A331 and the second contact A332 is switched between a contact state (closed state) and a separated state (open state).

The relay device 33 may be a latching relay that is to be energized both in switching to the open state and in switching to the closed state. In the case of the latching relay, the driving mechanism 334 includes a latching mechanism that maintains the open state and maintains the closed state, and coils of two systems that generate a magnetic force for switching from the open state to the closed state and a magnetic force for switching from the closed state to the open state. Instead of the coils of two systems, a single coil that can flow current with the direction of the current changed may be employed.

The static relay 336 is a semiconductor relay, a semiconductor switch, or the like, and does not include a contact on which freezing may occur. The static relay 336 includes a control terminal that receives a control voltage and two terminals that flow current.

The electric heating element 337 is an element such as a resistance wire that generates heat by current. The electric heating element 337 is disposed around the first contact A331 and the second contact A332 in the housing 339. The electric heating element 337 may be in contact with one or both of the first conductor 331 and the second conductor 332, and this contact allows efficient guiding of heat to the first contact A331 and the second contact A332 via the first conductor 331 and the second conductor 332, respectively. Alternatively, the electric heating element 337 may be configured to heat one or both of the first contact A331 and the second contact A332 by radiation of infrared light or visible light.

The static relay 336 and the electric heating element 337 are coupled in series between the first conductor 331 and the second conductor 332. With this configuration, when the static relay 336 is turned on and a voltage difference is present between the first conductor 331 and the second conductor 332, current flows to the electric heating element 337. According to such a configuration, the electric heating element 337 can be driven by transmitting the control voltage for switching the static relay 336 without preparing a drive circuit for driving the electric heating element 337.

The controller 35 is an ECU, includes a non-volatile storage unit 35a therein, and controls the relay device 33 by executing a control program stored in the storage unit 35a. The controller 35 may be configured to communicate with the vehicle controller 28 or a different ECU via a communication line 41 and control the relay device 33 in cooperation with the vehicle controller 28 or the different ECU. The vehicle controller 28 or the different ECU may monitor a state (power storage amount or the like) of the auxiliary battery 17 and a state (power storage amount or the like) of the restart battery 23, send a request for switching between the open and closed states of the relay device 33 to the controller 35 based on the states or the like, and the controller 35 may control the relay device 33 based on the request.

The controller 35 may monitor the state (power storage amount or the like) of each of the auxiliary battery 17 and the restart battery 23. The controller 35 and the vehicle controller 28 may be integrated, and a function of the controller 35 may be a part of a function of the vehicle controller 28.

The vehicle 1 further includes a diagnostic information storage unit 29 that stores diagnostic information of each unit, and the controller 35 can write diagnostic information related to the relay device 33 to the diagnostic information storage unit 29.

The electric power line 32 is configured to transmit electric power from the auxiliary battery 17 or the DC/DC converter 19 to the restart battery 23 when the power storage amount of the restart battery 23 is about to be depleted. Conversely, the electric power line 32 may be used to transmit electric power from the restart battery 23 to the auxiliary battery 17 when the power storage amount of the auxiliary battery 17 is about to be depleted. The transmission of the electric power via the electric power line 32 can suppress the depletion of the power storage amount of the restart battery 23 or the auxiliary battery 17. Furthermore, this can reduce the occurrence of a problem in the operation of the vehicle 1 due to the depletion of the power storage amount and reduce progress of deterioration of the restart battery 23 or the auxiliary battery 17 due to the depletion of the power storage amount.

The relay device 33 switches between execution and stop of electric power transmission from one side to the other side via the electric power line 32 by opening and closing the electric path of the electric power line 32. The relay device 33 disconnects the electric path of the electric power line 32, so that, for example, when the generator with motor function 21 flows large current to restart the engine 11, a voltage drop caused by the output of the large current can be suppressed from spreading to the electric power line 31 of the auxiliary machine 12.

The auxiliary battery 17, the restart battery 23, the electric power line 32, and the relay device 33 are disposed near the engine 11 (for example, in an engine room under a hood). The auxiliary battery 17 and the restart battery 23 are disposed as described above, so that current can be output to the starter motor 13 and the generator with motor function 21 with a short electric path, and a decrease in efficiency due to the electric power line 31 can be suppressed. Furthermore, the electric power line 32 and the relay device 33 are disposed as described above, so that the path of the electric power line 32 can be simplified.

On the other hand, in a cold district, the engine room is in a severe temperature environment such that the engine room becomes high in temperature due to driving of the engine 11, becomes low in temperature due to a temporary stop of the engine 11, or becomes temperature below the freezing point due to a relatively long stop of the engine 11. Thus, in the relay device 33 subjected to such a temperature environment, even when an internal space of the relay device 33 is sealed by the housing 339, moisture may enter the inside of the relay device 33 over time. Then, while the moisture is vaporized in the housing 339 at a high temperature, the electric power line 32 or the conductor coupled to the electric power line 32 becomes a low temperature, so that heat is transferred from the first conductor 331 and the second conductor 332 to the electric power line 32. Thus, temperature of each of the first contact A331 and the second contact A332 drops earlier than temperature of air in the housing 339. Then, dew condensation occurs on each of the first contact A331 and the second contact A332, and the temperature further drops to below the freezing point, so that the dew condensation may freeze.

The controller 35 can control the relay device 33 as follows and determine a switching state of the relay device 33 as follows.

First, a case where the relay device 33 is a latching relay will be described. When the controller 35 switches the relay device 33 from the open state to the closed state, the controller 35 controls to flow, to the coil 334a, current for switching the relay device 33 to the closed state. Thus, the driving mechanism 334 operates to bring the first contact A331 and the second contact A332 into contact with each other. In switching the relay device 33 from the closed state to the open state, the controller 35 controls to flow, to the coil 334a, current for switching the relay device 33 to the open state. Thus, the driving mechanism 334 operates to separate the first contact A331 and the second contact A332 from each other.

Next, a case where the relay device 33 is a non-latching relay will be described. When the controller 35 switches the relay device 33 from the open state to the closed state, the controller 35 controls to flow, to the coil 334a, current for switching the relay device 33 to the closed state and maintains an output of the current. Thus, the driving mechanism 334 operates to bring the first contact A331 and the second contact A332 into contact with each other, and this state is maintained. In switching the relay device 33 from the closed state to the open state, the controller 35 stops energization of the coil 334a.

Thus, the driving mechanism 334 returns to a state before the operation by an action of the spring 334d to separate the first contact A331 and the second contact A332 from each other.

The controller 35 can receive an output of a sensor that detects a voltage difference between one end side and the other end side of the electric power line 32 or an output of a current sensor of the electric power line 32 and can determine the open and closed state of the relay device 33 based on the outputs. The method of determining the open and closed state of the relay device 33 is not limited to the above example, and other various methods may be employed.

As described above, when the freezing occurs on each of the first contact A331 and the second contact A332, a switching malfunction of the relay device 33 may occur. The switching malfunction means that the relay device 33 does not switch between the open and closed states even when the driving mechanism 334 is energized (including a case where energization is stopped when the relay device 33 is a non-latching relay). By determining the actual open and closed state after performing control for switching the relay device 33 between the open and closed states, the controller 35 can recognize whether the switching has succeeded or the switching malfunction has occurred.

The controller 35 can perform control for melting the frozen part when freezing occurs on each of the first contact A331 and the second contact A332 (or on one of them). With the controller 35 performing a turn-on control on the static relay 336, the electric heating element 337 generates heat by energization to heat the first contact A331 and the second contact A332 (or one of them), so that the above-described control is achieved.

Control Processing of Relay Device 33

Next, an example of control processing of the relay device 33 by the controller 35 will be described.

Figure 3:
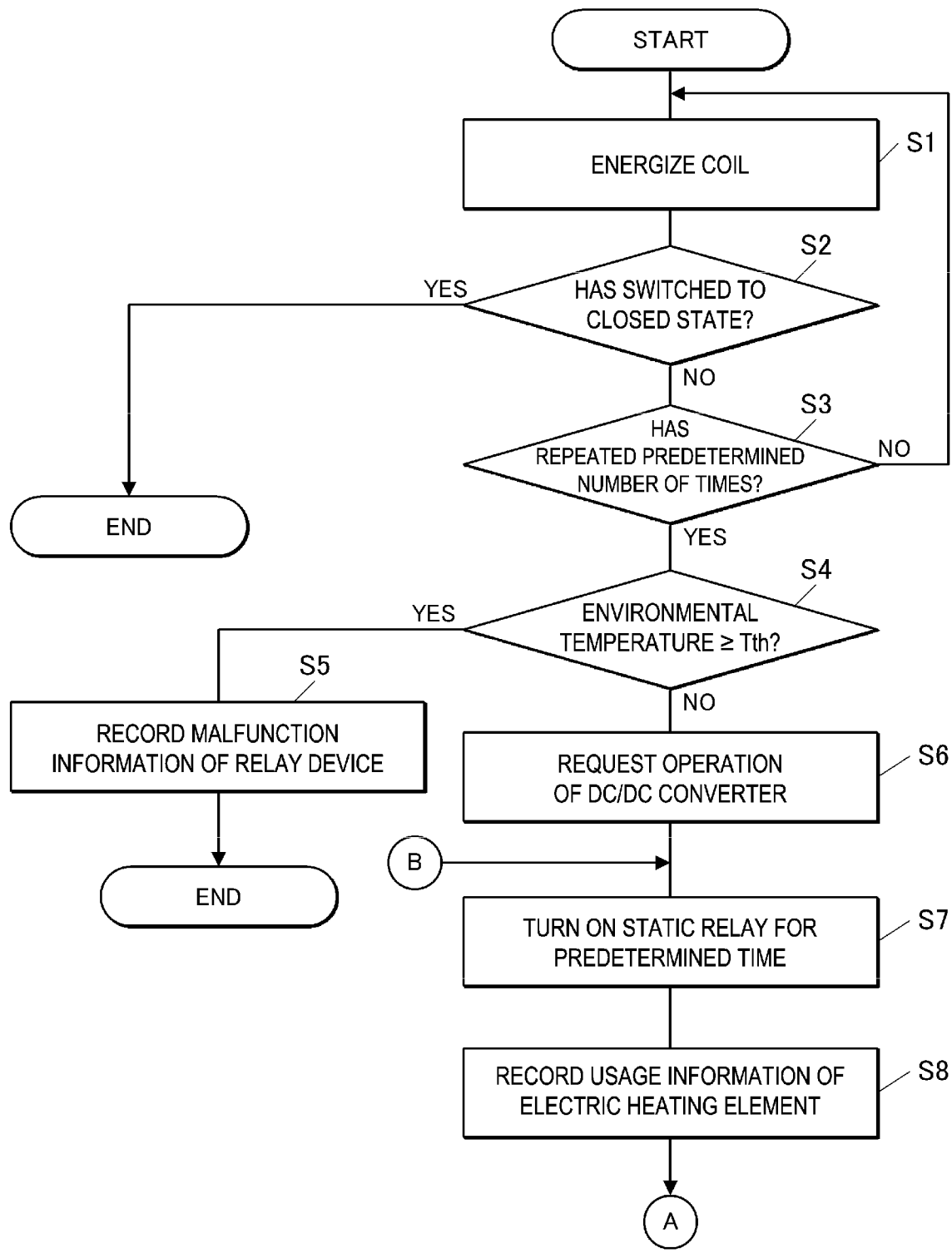
FIG. 3 is a part of a flowchart illustrating control processing of the power supply device executed by a controller.
Figure 4:
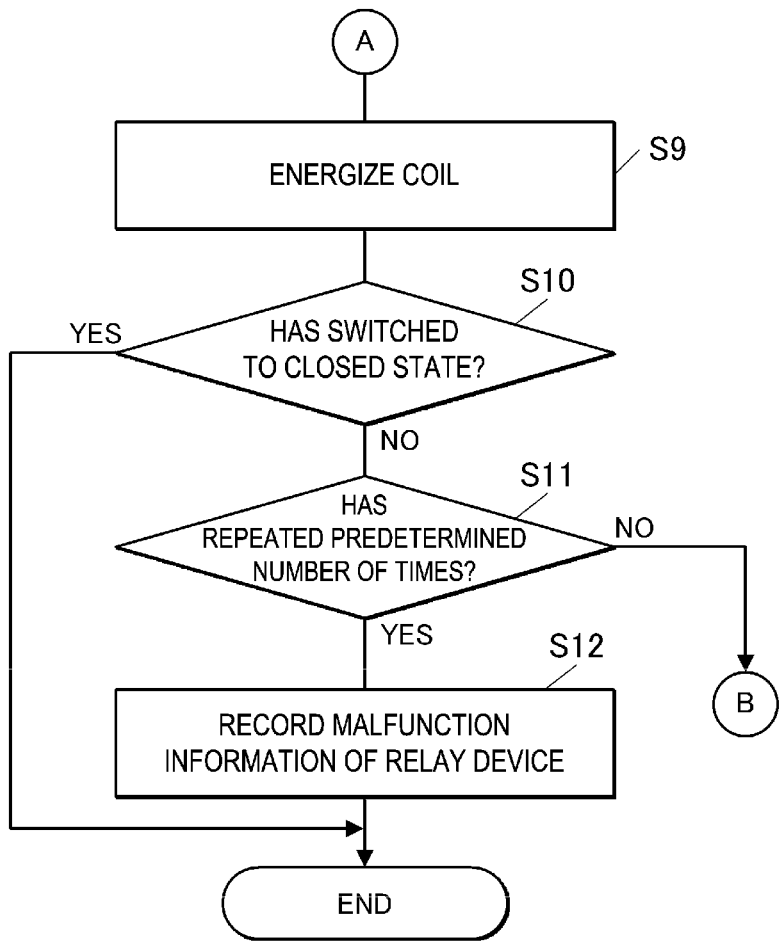
FIG. 4 is a part of a remaining flowchart illustrating the control processing of the power supply device executed by the controller.

FIGS. 3 and 4 are flowcharts illustrating the control processing of the relay device.

The controller 35 starts the control processing in FIG. 3 when a request is made for switching the electric path of the electric power line 32 from the open state to the closed state. When the control processing starts, the controller 35 first energizes the coil 334a in order to switch the relay device 33 to the closed state (step S1). Then, the controller 35 makes a determination whether the relay device 33 has been switched to the closed state (step S2), and when a result of the determination is YES, the controller 35 terminates the control processing.

On the other hand, when the switching malfunction occurs and a result of the determination in step S2 is NO, the controller 35 makes a determination whether the switching has been repeated a predetermined number of times (for example, three times) (step S3). When a result of the determination in step S3 is NO, the controller 35 returns the processing to step S1. The result of the determination of NO in step S2 or a result of the determination of YES in step S3 corresponds to an example of a first condition (a first condition indicating the switching malfunction of the open and closed state of the relay device 33) according to the disclosure.

On the other hand, when the result of the determination in step S3 is YES, the controller 35 makes a determination whether an environmental temperature detected by the temperature sensor 38 is a threshold temperature Tth or more (step S4). The threshold temperature Tth is set to an environmental temperature at which freezing cannot occur in the relay device 33 (for example, to a lower limit of the environmental temperature). A result of the determination in step S4 corresponds to an example of a third condition (a third condition related to the environmental temperature) according to the disclosure.

When a result of the determination in step S4 is YES, the controller 35 determines that the relay device 33 has a malfunction and writes malfunction information of the relay device 33 to the diagnostic information storage unit 29 (step S5). Then, the controller 35 terminates the control processing.

On the other hand, when a result of the determination in step S4 is NO, the controller 35 first requests the vehicle controller 28 to operate the DC/DC converter 19 for a first time length (step S6). The first time length described above is set to a period length in which processing of the subsequent step S7 is repeatedly executed.

Subsequently, the controller 35 switches the static relay 336 to the on state for a predetermined period of time (a period of time to allow the freezing to melt) (step S7). With the processing in step S7, the electric heating element 337 heats the first contact A331 and the second contact A332. If the first contact A331 and the second contact A332 are frozen, the frozen part can be melted. Furthermore, the controller 35 writes information that the electric heating element 337 has been used to the diagnostic information storage unit 29 (step S8). The fact that step S7 has been executed corresponds to an example of a second condition (second condition indicating that the turn-on control has been performed on the static relay 336) according to the disclosure.

Thereafter, the controller 35 energizes the coil 334a in order to switch the relay device 33 to the closed state (step S9) and makes a determination whether the relay device 33 has been switched to the closed state (step S10). Then, when a result of the determination in step S10 is YES (when the controller 35 determines that the relay device 33 has been switched to the closed state), the controller 35 terminates the control processing. On the other hand, when a result of the determination in step S10 is NO, the controller 35 makes a determination whether the switching has been repeated a predetermined number of times (for example, three times) (step S11). When a result of the determination in step S11 is NO, the controller 35 returns the processing to step S7.

On the other hand, when a result of the determination in step S11 is YES, the controller 35 determines that the relay device 33 has a malfunction and writes malfunction information of the relay device 33 to the diagnostic information storage unit 29 (step S12). Then, the controller 35 terminates the control processing.

With the control processing of the relay device 33 as described above, even when the freezing occurs on each of the first contact A331 and the second contact A332, the frozen part is melted, so that the relay device 33 can be switched to the closed state. Thus, when the power storage amount of the restart battery 23 or the auxiliary battery 17 is about to be depleted, the electric path of the electric power line 32 is brought into the closed state, so that the above-described depletion can be suppressed.

Furthermore, with the control processing of the relay device 33 as described above, when the relay device 33 has a switching malfunction due to the freezing, the relay device 33 is suppressed from being determined to have a malfunction just because of the switching malfunction although the relay device 33 will return to normal if the freezing is eliminated. Thus, processing of the relay device 33 such as maintenance and replacement can be appropriately performed.

A program of the control processing of the relay device 33 described above is stored in a non transitory computer readable medium such as the storage unit 35a of the controller 35. The controller 35 may be configured to read the program stored on a portable non transitory computer readable medium and execute the program. The portable non transitory computer readable medium may store the program of the control processing of the relay device 33 described above.

As described above, according to the relay device 33 of the present embodiment, the electric heating element 337 that can be driven by the control of the static relay 336 is disposed so as to be able to heat one or both of the first contact A331 and the second contact A332. Thus, when the freezing occurs on each of the first contact A331 and the second contact A332, the frozen part is melted by driving the electric heating element 337, so that the relay device 33 can be normally operated. Furthermore, according to the relay device 33 of the present embodiment, the static relay 336 and the electric heating element 337 are coupled between the first conductor 331 and the second conductor 332. Thus, a drive circuit that can output a drive current of the electric heating element 337 may not be separately prepared. Furthermore, a wiring structure for incorporating the relay device 33 into the system can be simplified, such that wiring that supplies the drive current of the electric heating element 337 from a distant place to the relay device 33 is not necessary.

Furthermore, according to the relay device 33 of the present embodiment, the static relay 336 and the electric heating element 337 are disposed inside the housing 339. Thus, heat of the electric heating element 337 can be efficiently sent to each of the first contact A331 or the second contact A332. Furthermore, as compared with a case where the static relay 336 and the electric heating element 337 are disposed outside the housing 339, the relay device 33 is integrally configured including the static relay 336 and the electric heating element 337. Thus, handling of the relay device 33 is facilitated.

Furthermore, according to the relay device 33 of the present embodiment, the configuration of the terminals provided outside the housing 339 is a configuration in which the fifth terminal T336 for transmitting the control voltage to the static relay 336 is mainly added to the first terminal T331 and the second terminal T332 to which the electrical path to be opened and closed is coupled and the third terminal T334a and the fourth terminal T334b for energizing the driving mechanism 334. Thus, a coupling structure of the wiring for incorporating the relay device 33 into the system can be simplified.

Furthermore, the power supply device 30 of the vehicle 1 of the present embodiment includes the electric power line 32 that can transmit electric power between the auxiliary battery 17 and the restart battery 23. The relay device 33 is provided so as to be able to open and close the electric path of the electric power line 32. In the above-described configuration, the auxiliary battery 17, the restart battery 23, and the electric power line 32 are disposed near the engine 11. For this reason, it is convenient that the relay device 33 can also be disposed near the engine 11. On the other hand, the vicinity of the engine 11 is in a severe temperature environment, and when the relay device 33 is in such an environment in a cold district, the temperature of each of the first contact A331 and the second contact A332 may significantly drop earlier than the air temperature in the housing 339 in a state where air in the housing 339 contains moisture. This is because the first contact A331 is coupled to an electric power transmission harness via the conductors (the first terminal T331 and the first conductor 331), and the second contact A332 is coupled to the electric power transmission harness via the conductors (the second terminal T332 and the second conductor 332). Furthermore, the harness has a high thermal conductivity and a large heat capacity. Thus, when the harness is cooled by the outside air in the cold district, heat is more rapidly transferred from each of the first contact A331 and the second contact A332 to the harness than from the air in the housing 339. In this situation, dew condensation and freezing may occur on each of the first contact A331 and the second contact A332. However, the relay device 33 of the present embodiment can be switched between the open state and the closed state even when the dew condensation and the freezing occur on each of the first contact A331 and the second contact A332. This increases the degree of freedom of disposition of the relay device 33, and the relay device 33 can be disposed even in the severe temperature environment of the engine room.

Furthermore, according to the power supply device 30 of the vehicle 1 of the present embodiment, when the switching malfunction occurs in the relay device 33, the controller 35 first operates the DC/DC converter 19 (outputs a request for operation to the vehicle controller 28). Next, the controller 35 performs the turn-on control on the static relay 336. Note that the order of the operation of the DC/DC converter 19 and the turn-on control on the static relay 336 may be reversed. As described above, operating the DC/DC converter 19 can increase the voltage of one side of the electric power line 32 (the side to which the DC/DC converter 19 is coupled), and the voltage can cause current to flow to the electric heating element 337 of the relay device 33.

In a situation in which the relay device 33 is switched to the closed state, in many cases, the power storage amount of the restart battery 23 is reduced, so that the voltage of the restart battery 23 drops. In other words, the voltage of one side of the electric power line 32 (the side to which the restart battery 23 is coupled) becomes the low voltage of the first voltage system. Thus, by operating the DC/DC converter 19 to cause the voltage of one side of the electric power line 32 to be the high voltage of the first voltage system, the voltage difference between the first conductor 331 and the second conductor 332 of the relay device 33 can be a predetermined value. Thus, by operating the DC/DC converter 19 as described above, an effect is also obtained in which a variation in an amount of heat generated by the electric heating element 337 can be suppressed.

Furthermore, according to the power supply device 30 of the vehicle 1 of the present embodiment, the controller 35 performs the malfunction determination on the relay device 33 based on the first condition indicating the switching malfunction of the relay device 33 between the open and closed states and the second condition indicating whether the turn-on control on the static relay 336 has been performed. The controller 35 performs the malfunction determination on the relay device 33 based on the first condition indicating the switching malfunction of the relay device 33 between the open and closed states and the third condition related to the environmental temperature. Thus, the relay device 33 can be suppressed from being determined to be a malfunction when the switching malfunction of the open and closed state occurs due to the freezing but the relay device 33 normally operates by eliminating the freezing. Thus, the processing of the relay device 33 such as maintenance and replacement can be appropriately performed based on the malfunction determination.

The embodiment of the disclosure has been described above. However, the disclosure is not limited to the above embodiment. For example, the example has been described in the above-described embodiment in which the static relay 336 and the electric heating element 337 are accommodated in the housing 339. However, one or both of the static relay 336 and the electric heating element 337 may be disposed outside the housing 339. For example, the electric heating element 337 may be disposed to heat the first terminal T331 or the second terminal T332. With this disposition, the electric heating element 337 can heat the first contact A331 and the second contact A332 via the first conductor 331 or the second conductor 332.

In the above-described embodiment, the example has been described in which the relay device 33 is coupled so as to open and close the electric path of the electric power line 32. However, the relay device 33 may be applied as a relay coupled between the auxiliary battery 17 and electrical equipment (the auxiliary machine 12 or other devices) or may be applied as a relay that opens and closes an electric path of an electric power line of the traction battery 5. In the above-described embodiment, the example has been described in which the electric heating element 337 is energized by using the output of the DC/DC converter 19. However, the use of the output of the DC/DC converter 19 may be omitted. The vehicle on which the relay device 33 is to be mounted is not limited to a hybrid electric vehicle (HEV) as the vehicle 1 of the above-described embodiment and may be an engine vehicle or an electric vehicle (EV).

In the above-described embodiment, the example has been described in which the relay device 33 is to be mounted on the power supply device 30 of vehicle; however, the relay device according to the disclosure may be mounted on various devices such as an industrial machine, for example. When a severe temperature environment occurs in a place in the devices, an effect similar to that of the present embodiment can be obtained by applying the relay device according to the disclosure as a relay disposed in the place. In addition, details described in the embodiments can be appropriately changed without departing from the gist of the disclosure.

Advantageous Effects of Invention

According to a relay device of the disclosure, even when freezing occurs on a first contact or a second contact, the first contact or the second contact can be unfrozen by heating with an electric heating element, and the relay device can be switched between open and closed states. According to a power supply device of a vehicle of the disclosure, even in a cold district where the freezing occurs on the first contact or the second contact of the relay device, the first contact or the second contact can be unfrozen, and a malfunction of the power supply device can be reduced.

The invention claimed is:

1. A relay device comprising:
   a first contact and a second contact;
   a driving mechanism configured to cause the first contact and the second contact to be close to each other or separated from each other;
   a first conductor electrically coupled to the first contact;
   a second conductor electrically coupled to the second contact; and
   a static relay and an electric heating element coupled between the first conductor and the second conductor,
   wherein the electric heating element is disposed to allow heating of one or both of the first contact and the second contact.

2. The relay device according to claim 1, further comprising:
   a first terminal electrically coupled to the first conductor;
   a second terminal electrically coupled to the second conductor;
   a third terminal and a fourth terminal that are configured to energize the driving mechanism;
   a fifth terminal configured to transmit a control voltage to the static relay; and
   a housing exposing the first terminal, the second terminal, the terminal, the fourth terminal, and the fifth terminal to outside the housing and accommodating, inside the housing, the first conductor, the second conductor, the driving mechanism, the static relay, and the electric heating element.

3. A power supply device for a vehicle, the vehicle comprising an engine that is an internal combustion engine, a first battery configured to supply electric power to an auxiliary machine of the engine, and a second battery configured to supply electric power to a restart motor of the engine, the power supply device comprising:
   an electric power line configured to transmit electric power between the first battery and the second battery; and
   the relay device according to claim 2, the relay device being configured to open and close an electric path of the electric power line.

4. The power supply device for the vehicle according to claim 3, wherein
   the vehicle further comprises a third battery configured to store electric power to drive the vehicle, and a DC/DC converter configured to convert a voltage of the third battery into a voltage of the first battery,
   the power supply device further comprises a controller configured to control the relay device, and
   the controller is configured to, when a switching malfunction of the relay device occurs, operate the DC/DC converter and perform a turn-on control on the static relay.

5. A power supply device for a vehicle, the vehicle comprising an engine that is an internal combustion engine, a first battery configured to supply electric power to an auxiliary machine of the engine, and a second battery configured to supply electric power to a restart motor of the engine, the power supply device comprising:
   an electric power line configured to transmit electric power between the first battery and the second battery; and
   the relay device according to claim 1, the relay device being configured to open and close an electric path of the electric power line.

6. The power supply device for the vehicle according to claim 5, wherein
   the vehicle further comprises a third battery configured to store electric power to drive the vehicle, and a DC/DC converter configured to convert a voltage of the third battery into a voltage of the first battery,
   the power supply device further comprises a controller configured to control the relay device, and
   the controller is configured to, when a switching malfunction of the relay device occurs, operate the DC/DC converter and perform a turn-on control on the static relay.

7. The power supply device for the vehicle according to claim 5, further comprising a controller configured to control the relay device,
   wherein the controller is configured to perform malfunction determination on the relay device based on a first condition indicating a switching malfunction of the relay device and a second condition indicating that the turn-on control has been performed on the static relay or based on the first condition and a third condition related to an environmental temperature.

8. The power supply device for the vehicle according to claim 5, further comprising a controller configured to control the relay device,
   wherein the controller is configured to perform malfunction determination on the relay device based on a first condition indicating a switching malfunction of the relay device and a second condition indicating that the turn-on control has been performed on the static relay or based on the first condition and a third condition related to an environmental temperature.

* * * * *